(12) United States Patent
Kimba Dit Adamou

(10) Patent No.: US 11,375,418 B2
(45) Date of Patent: Jun. 28, 2022

(54) CONDITION HANDOVER METHOD, RELATED DEVICES AND COMPUTER-READABLE STORAGE MEDIUM

(71) Applicant: VIVO MOBILE COMMUNICATION CO., LTD., Chang'an Dongguan (CN)

(72) Inventor: Boubacar Kimba Dit Adamou, Chang'an Dongguan (CN)

(73) Assignee: VIVO MOBILE COMMUNICATION CO., LTD., Guangdong (CN)

(\*) Notice: Subject to any disclaimer, the term of this patent is extended or adjusted under 35 U.S.C. 154(b) by 0 days.

(21) Appl. No.: 16/969,734

(22) PCT Filed: Jan. 28, 2019

(86) PCT No.: PCT/CN2019/073394
§ 371 (c)(1),
(2) Date: Aug. 13, 2020

(87) PCT Pub. No.: WO2019/157937
PCT Pub. Date: Aug. 22, 2019

(65) Prior Publication Data
US 2021/0007021 A1 Jan. 7, 2021

(30) Foreign Application Priority Data
Feb. 13, 2018 (CN) .......................... 201810151039.1

(51) Int. Cl.
*H04W 36/00* (2009.01)
*H04W 76/36* (2018.01)
(Continued)

(52) U.S. Cl.
CPC ....... *H04W 36/0083* (2013.01); *H04W 28/26* (2013.01); *H04W 36/08* (2013.01); *H04W 76/36* (2018.02)

(58) Field of Classification Search
CPC . H04W 36/0083; H04W 76/36; H04W 28/26; H04W 36/08
See application file for complete search history.

(56) References Cited

U.S. PATENT DOCUMENTS 9,155,014 B2 10/2015 Tenny et al.
2013/0143566 A1 6/2013 Kubota et al.
(Continued)

FOREIGN PATENT DOCUMENTS

| CN | 102934486 A | 2/2013 |
| CN | 107667481 A | 2/2018 |
| WO | 2014067567 A1 | 5/2014 |

OTHER PUBLICATIONS

Extended European Search Report for related Application No. 19755017.1; dated Mar. 15, 2021.
(Continued)

*Primary Examiner* — Shukri Taha
(74) *Attorney, Agent, or Firm* — von Briesen & Roper, s.c.

(57) ABSTRACT

A condition handover method, a related equipment and a computer-readable storage medium are provided. The condition handover method applied to a source network unit includes: receiving indication information indicating that a CHO is performed by a terminal; and sending, to a first target network unit corresponding to the CHO performed by the terminal, data to be forwarded corresponding to the terminal.

10 Claims, 10 Drawing Sheets

(51) Int. Cl.
 *H04W 28/26* (2009.01)
 *H04W 36/08* (2009.01)

(56) References Cited

U.S. PATENT DOCUMENTS

| | | |
|---|---|---|
| 2017/0215117 A1 | 7/2017 | Kwon et al. |
| 2019/0104452 A1* | 4/2019 | Park .................... H04W 36/38 |
| 2019/0174373 A1* | 6/2019 | Kanazawa ........ H04W 36/0085 |
| 2020/0045596 A1* | 2/2020 | Liu .................. H04W 36/0072 |

OTHER PUBLICATIONS

Hisilicon Huawei, "Further discussion on Conditional HO", Nov. 27-Dec. 1, 2017, 3GPP TSG-RAN WG2 #100, Reno, Nevada, USA.
International Search Report & Written Opinion related to Application No. PCT/CN2019/073394; dated Aug. 27, 2020.
Second Chinese Office Action for related Chinese Application No. 201810151039.1; dated Nov. 4, 2020.
Nokia, Alcatel-Lucent Shanghai Bell, "Conditional handover—basic aspects and feasibility in Rel-15", Jun. 27-29, 2017, 3GPP TSG-RAN WG2 NR Adhoc #2, Qingdao, China.
ASTRI, TCL Communication Ltd, "Discussion on Conditional Handover in NR", Feb. 26-Mar. 2, 2018, 3GPP TSG-RAN WG2 Meeting #101, Athens, Greece.

* cited by examiner

CONDITION HANDOVER METHOD, RELATED DEVICES AND COMPUTER-READABLE STORAGE MEDIUM

CROSS-REFERENCE TO RELATED APPLICATION

The present application is the U.S. national phase of PCT Application PCT/CN2019/073394 filed on Jan. 28, 2019, which claims a priority of Chinese patent application No. 201810151039.1 filed on Feb. 13, 2018, which is incorporated herein by reference in its entirety.

TECHNICAL FIELD

The present disclosure relates to the field of handover technology, in particular to a condition handover method, a related equipment and a computer-readable storage medium for improving a service continuity.

BACKGROUND

At present, the 5G system has begun to study the condition handover (Condition Handover, CHO).

Relevant regulations on the condition handover in the related art only regulate a basic process as follows: a terminal will periodically report measurement results, and a source network unit will select a target base station based on the measurement results reported by the terminal and send a handover request to the target base station in advance. When the target base station accepts the request, the source network unit will return a CHO command to the terminal, the CHO command carries a CHO condition. i.e., in which circumstances the terminal may perform a handover to the target base station.

A very important indicator for the handover is to ensure an integrity of data, while the simple basic process specifications mentioned above may not guarantee a business continuity in a CHO process. Therefore, it is necessary to further standardize the CHO, so as to improve the data integrity.

SUMMARY

A condition handover method, a related equipment and a computer-readable storage medium are provided in the embodiments of the present disclosure, to improve the data integrity.

In order to solve the above technical issues, in a first aspect, a CHO method is provided in an embodiment of the present disclosure, including:

receiving indication information indicating that a CHO is performed by a terminal; and sending, to a first target network unit corresponding to the CHO performed by the terminal, data to be forwarded corresponding to the terminal.

In a second aspect, a CHO method applied to a terminal is provided in an embodiment of the present disclosure, including:

receiving a CHO command sent by a source network unit;

when determining to perform a CHO according to the CHO command, sending, to the source network unit, first indication information indicating that the CHO is performed by the terminal.

In a third aspect, a CHO method applied to a terminal is provided in an embodiment of the present disclosure, including:

receiving a CHO command sent by a source network unit;

when determining to perform a CHO according to the CHO command, sending data transmission related information to a target network unit, where the data transmission related information is used by the source network unit to determine data to be transmitted; and receiving, from the target network unit, data to be forwarded, where the data to be forwarded is sent by the source network unit.

In a fourth aspect, a CHO method applied to a first target network unit is provided in an embodiment of the present disclosure, including:

after determining that a terminal performs a CHO to the first target network unit, sending, to a source network unit, second indication information indicating that the CHO is performed by terminal;

receiving data to be forwarded corresponding to the terminal and sent by the source network unit; and sending, to the terminal, the data to be forwarded.

In a fifth aspect, a source network unit is provided in an embodiment of the present disclosure, including:

a receiving module, configured to receive indication information indicating that a CHO is performed by a terminal; and a first sending module, configured to send, to a first target network unit corresponding to the CHO performed by the terminal, data to be forwarded corresponding to the terminal.

In a sixth aspect, a terminal is provided in an embodiment of the present disclosure, including:

a receiving module, configured to receive a CHO command sent by a source network unit;

a sending module, configured to, when determining to perform a CHO according to the CHO command, send, to the source network unit, first indication information indicating that the CHO is performed by the terminal.

In a seventh aspect, a terminal is provided in an embodiment of the present disclosure, including:

a first receiving module, configured to receive a CHO command sent by a source network unit;

a sending module, configured to, when determining to perform a CHO according to the CHO command, send data transmission related information to a target network unit, where the data transmission related information is used by the source network unit to determine data to be transmitted; and a second receiving module, configured to receive, from the target network unit, data to be forwarded, where the data to be forwarded is sent by the source network unit.

In an eighth aspect, a first target network unit is provided in an embodiment of the present disclosure, including:

a first sending module, configured to, after determining that a terminal performs a CHO to the first target network unit, send, to a source network unit, second indication information indicating that the CHO is performed by terminal;

a first receiving module, configured to receive data to be forwarded corresponding to the terminal and sent by the source network unit; and a second sending module, configured to send, to the terminal, the data to be forwarded.

In a ninth aspect, a network device is provided in an embodiment of the present disclosure, including a processor, a memory and a computer program stored in the memory and executable on the processor, where the processor executes the computer program to perform the CHO method in the first aspect hereinabove; or the processor executes the computer program to perform the CHO method in the second aspect hereinabove; or the processor executes the computer program to perform the CHO method in the third aspect hereinabove; or the computer program to perform the CHO method in the fourth aspect hereinabove.

In a tenth aspect, a computer-readable storage medium is provided in an embodiment of the present disclosure, where a computer program is stored in the computer-readable storage medium, and a processor executes the computer program to perform the CHO method in the first aspect hereinabove; or the processor executes the computer program to perform the CHO method in the second aspect hereinabove; or the processor executes the computer program to perform the CHO method in the third aspect hereinabove; or the computer program to perform the CHO method in the fourth aspect hereinabove.

According to the embodiments of the present disclosure, the terminal will notify the source network unit of the occurrence of handover, the source network unit may forward the undelivered downlink data to the target base station in time, so as to ensure the data integrity.

DETAILED DESCRIPTION

The technical solutions in the embodiments of the present disclosure will be described clearly and completely with reference to the drawings in the embodiments of the present disclosure. Obviously, the described embodiments are part of the embodiments of the present disclosure, not all of the embodiments. Based on the embodiments in the present disclosure, all other embodiments obtained by those of ordinary skill in the art without creative work shall fall within the scope of the present disclosure.

Figure 1:
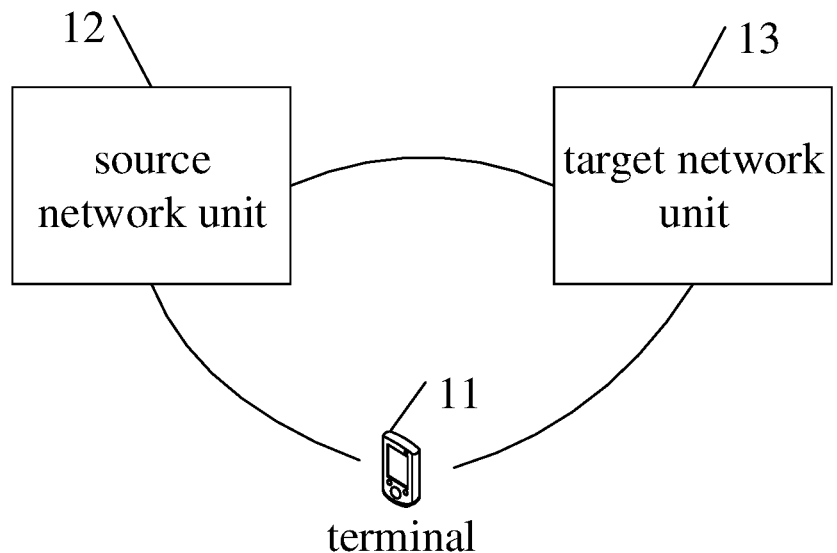
FIG. 1 is a schematic structural view of an application environment of an embodiment of the present disclosure.

Referring to FIG. 1 which is a schematic structural view of an application environment of an embodiment of the present disclosure. As shown in FIG. 1, the application environment includes a terminal 11, a source network unit 12 and a target network unit 13.

The terminal 11 may be a user equipment user equipment (User Equipment, UE), for example: a mobile phone, a Tablet Personal Computer, a laptop (Laptop Computer), a personal digital assistant (Personal Digital Assistant, PDA), a mobile for terminal-side devices such as a mobile Internet device (Mobile Internet Device, MID) or a wearable device, it should be noted that the specific type of the terminal 11 is not limited in the embodiment of the present disclosure.

The source network unit 12 may be any network side device or network function. For example, the source network unit 12 may be a network unit of a wireless access network or a network unit of a core network. In addition, the source network unit 12 can interact with the terminal 11 or with other network units. The target network unit 13 may be any network side device or network function different from the source network unit 12, and the target network unit 13 may be a network unit of a wireless access network or a core network unit.

In the embodiments of the present disclosure, the core network unit may include at least one of the following: core network equipment, core network node, core network function, core network unit, mobility management entity (Mobility Management Entity. MME), access mobility management function (Access Mobility Management Function, AMF), session management function (Session Management Function, SMF), user plane function (User Plane Function, UPF), serving gateway (Serving Gateway, SGW), PDN Gateway, policy control function (Policy Control Function, PCF), policy and charging rules function (Policy and Charging Rules Function, PCRF), serving GPRS support node (Serving GPRS Support Node, SGSN), gateway GPRS support node (Gateway GPRS Support Node, GGSN) wireless access network equipment.

In the embodiments of the present disclosure, the radio access network unit may include at least one of the following: radio access network equipment, radio access network node, radio access network function, radio access network unit, 3GPP radio access network, Non-3GPP radio access network, centralized unit (Centralized Unit, CU), distributed unit (Distributed Unit, DU), base station, evolved Node B (eNB), 5G base station (gNB), radio network controller (Radio Network Controller, RNC), base station (NodeB), non-3GPP Inter-working Function (N3IWF), access controller (Access Controller, AC) node, access point (Access Point, AP) equipment or a wireless local area networks (Wireless Local Area Networks, WLAN) node.

The base station can be a Base Transceiver Station (Base Transceiver Station, BTS) in GSM or CDMA, a base station (NodeB) in WCDMA, or an eNB or e-NodeB (evolutional Node B) in LTE. The 5G base station (gNB) is not limited in the embodiment of the present disclosure.

The embodiments of the present disclosure perform further specifications for CHO, which can improve data integrity.

Figure 2:
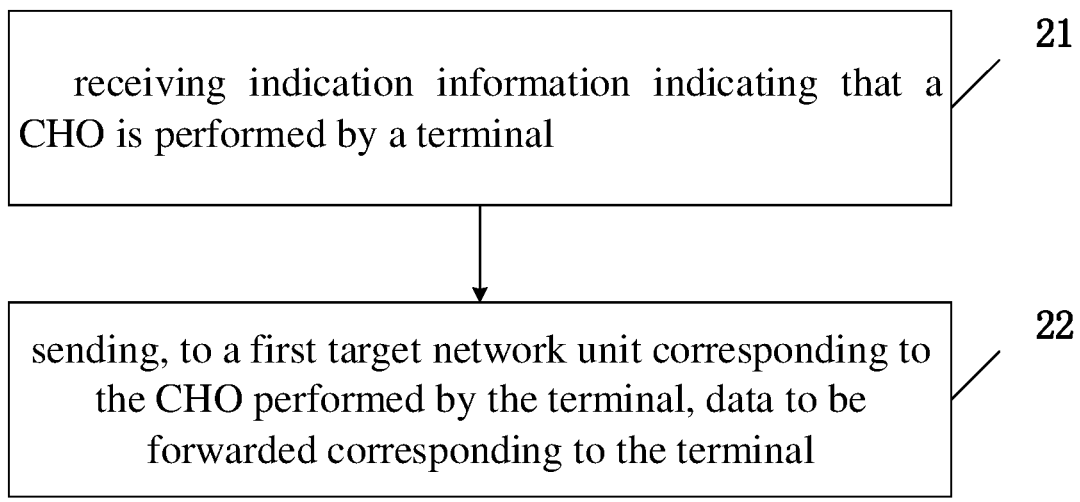
FIGS. 2 to 5 are schematic flowcharts of different condition handover methods used in a source network device side in the embodiments of the present disclosure.

As shown in FIG. 2, a condition handover method in an embodiment of the present disclosure, which is applied to a source network element (such as a source base station), includes:

Step 21: receiving indication information indicating that a CHO is performed by a terminal;

Step 22: sending, to a first target network unit corresponding to the CHO performed by the terminal, data to be forwarded corresponding to the terminal.

According to the embodiments of the present disclosure, when a terminal performs a CHO, a source network unit will receive an indication message, and the source network unit may confirm that the terminal has performed the CHO after the source network unit receives the indication information, and the data to be forwarded corresponding to terminal is sent to a target network unit corresponding to the CHO performed by the terminal, and then the target network unit may send the data to the terminal, thereby guaranteeing the data integrity.

Figure 3:
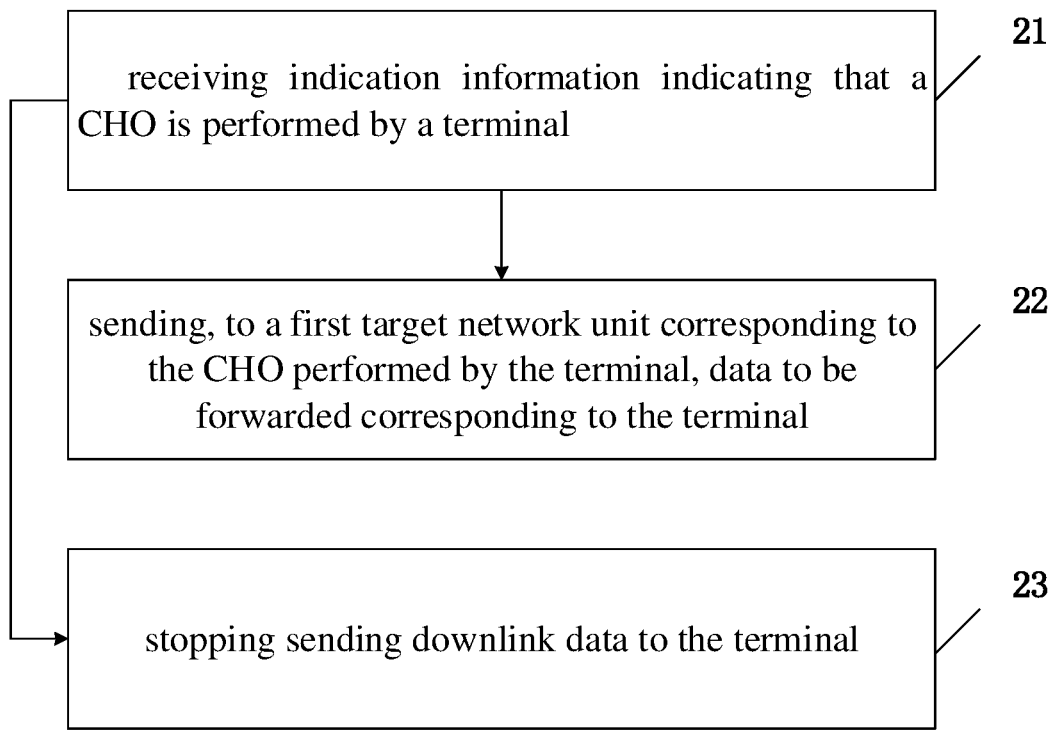

At the same time, in order to avoid the waste of wireless resources, in the embodiment of the present disclosure, as shown in FIG. 3, after the source network unit receives the indication information, the method further includes:

Step 23: stopping sending downlink data to the terminal.

In the embodiment of the present disclosure, the source network unit triggers, based on the received indication information, the transmission of the data to be forwarded to the target network unit, and the indication information may be implemented in a variety of ways, which will be described in the following.

"Method 1: the indication information is sent by the terminal"

When the indication information is sent by the terminal, the indication information is: the first indication information sent when the terminal determines to perform a CHO according to a CHO condition.

That is, in Method 1, the terminal finds that one of the CHO conditions is satisfied during operation, and when the terminal determines to perform the CHO, the terminal will indicate the source network unit and the terminal will perform the CHO.

Since the CHO of the terminal is not completed at this time, the source network unit will stop sending downlink data to the terminal, and send, to the target network unit, the received downlink data (data to be transmitted) that has not been sent. After the CHO is completed, the target network unit may send to the terminal the data received from the source network unit, thereby ensuring the data integrity of the terminal.

In the embodiment of the present disclosure, the source network unit selects one or more target network units based on the measurement results reported by the terminal, and sends a pre-handover request to the selected target base station. Therefore, there may be multiple candidate target base stations.

When there are multiple candidate target network units, the source network unit only knows that the terminal has performed the CHO and does not know the target network unit selected by the base station, so the source network unit has to transmit the data to be transmitted to all the candidate target network units. Obviously, this method wastes the limited resources.

Therefore, in order to make the embodiment of the present disclosure applicable to the situation of multiple candidate target network units and save resources, in Method 1, the first indication information further carries the identification information of the first target network unit.

In this case, based on the first indication information, the source network unit may not only know that the terminal has performed CHO, but also determine the target network unit, so the source network unit may send the data to be forwarded to the corresponding target network unit, thereby ensuring the data integrity and saving the limited resources.

"Method 2: the indication information is sent by the target network"

When the indication information is sent by the target network, the indication information is: the second indication information sent by the first target network unit after determining that the terminal performs the CHO to the first target network unit.

That is, in Method 2, the terminal finds that one of the CHO conditions is met during the operation, and determines to perform a CHO.

Once the terminal starts to perform the CHO process, it needs to interact with the target network unit corresponding to the CHO to complete the CHO process. When the target network unit determines through the interactive process any time point after the terminal performs the CHO to the first target network unit (e.g., when a CHO request is received, when a CHO completion message is received, etc.), the second indication information may be sent to the source network unit to trigger the source network unit to transmit the data to be transmitted.

Figure 4:
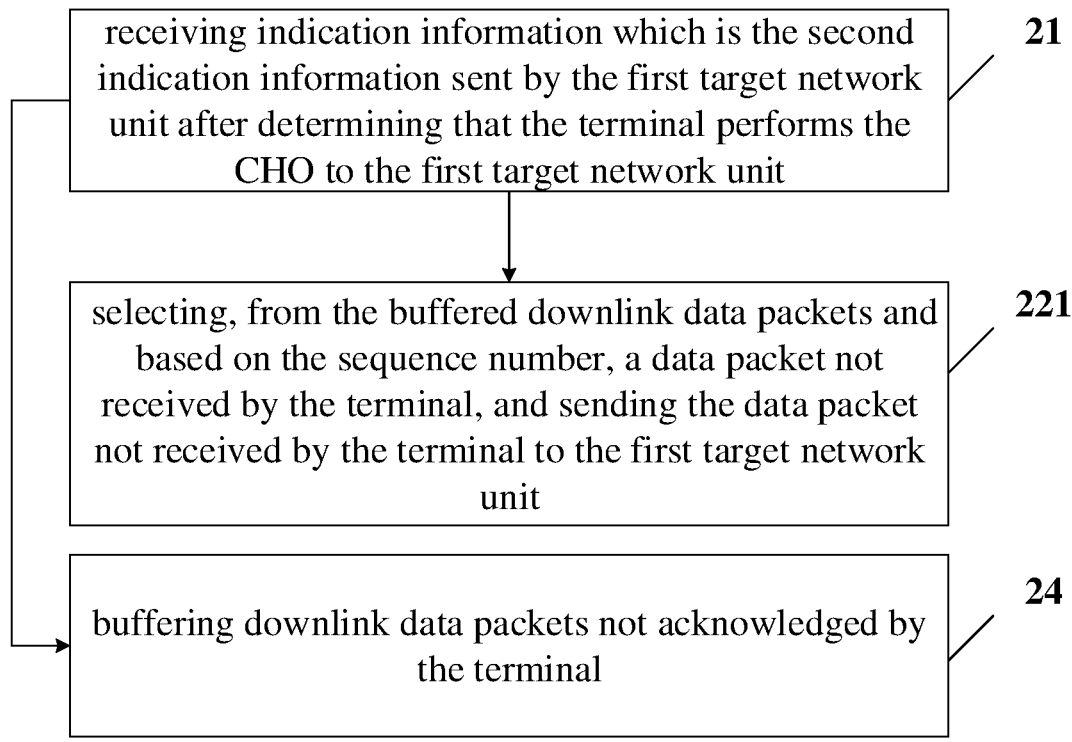

At this time, since the source network unit does not know when the terminal will start to perform the CHO, after the source network unit sends the CHO command to the terminal, as shown in FIG. 4, the method further includes:

Step 24: buffering downlink data packets not acknowledged by the terminal, to ensure that the terminal may obtain any unacknowledged downlink data packets after CHO.

The target network unit carries in the second indication information a sequence number of a data packet received by the terminal, and the step 22 further includes step 221: selecting by the source network unit, from the buffered downlink data packets and based on the sequence number, a data packet not received by the terminal, and sending, by the source network unit, the data packet not received by the terminal to the first target network unit.

In Method 2, although the source network unit does not know when the terminal will perform the CHO, the source network unit buffers all data packets not acknowledged by the terminal. Therefore, the source network unit may, after receiving the notification notifying that the terminal has performed the CHO to the target base station, send the all the data not received by the terminal to the target base station based on the data transmission information of the terminal, and then the target base station may send the data to the terminal, thereby ensuring the data integrity.

At the same time, in the embodiment of the present disclosure, there may be multiple candidate target network units for both Method 1 and Method 2.

When each target network unit accepts the CHO request sent by the source network unit, it needs to reserve certain resources to meet the terminal's CHO demand.

Figure 5:
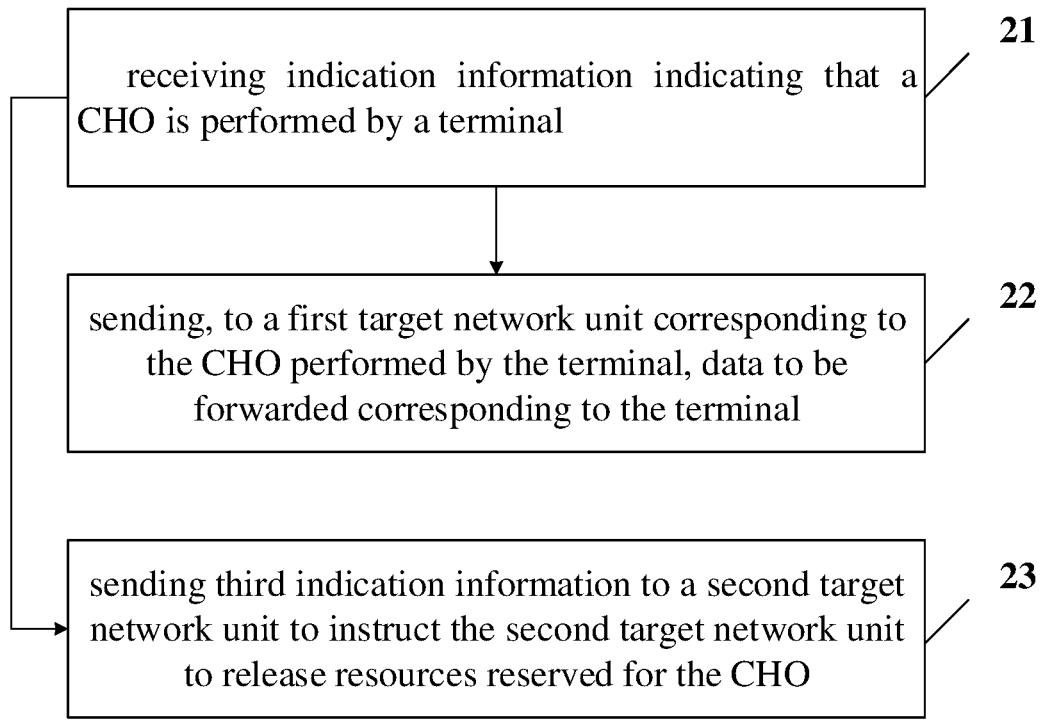

After the terminal has completed the CHO, the resources reserved by other target network units no longer need to be reserved. Therefore, in order to improve resource utilization, in the embodiment of the present disclosure, as shown in FIG. 5, subsequent to the receiving the indication information, the method further includes:

Step 25: sending third indication information to a second target network unit to instruct the second target network unit to release resources reserved for the CHO, where the second target network unit is a unit that reserves the resources for the CHO of the terminal other than the first target network unit.

For the terminal side, corresponding to the above-mentioned Method 1 or Method 2, the embodiments of the present disclosure provide different implementation manners, which are respectively described as follows.

Figure 6:
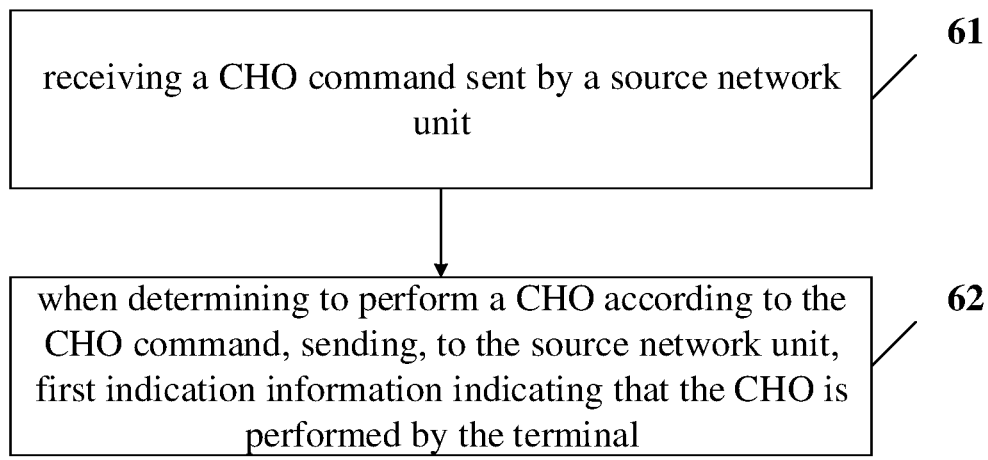
FIGS. 6-7 are schematic flowcharts of different condition handover methods used in a terminal side in the embodiments of the present disclosure.

As shown in FIG. 6, a condition handover method applied to a terminal includes:

Step 61: receiving a CHO command sent by a source network unit;

Step 62: when determining to perform a CHO according to the CHO command, sending, to the source network unit, first indication information indicating that the CHO is performed by the terminal.

In order to adapt to the situation where there are multiple candidate target network units, the first indication information may carry a unit identifier of the first target network unit corresponding to the CHO operation.

Figure 7:
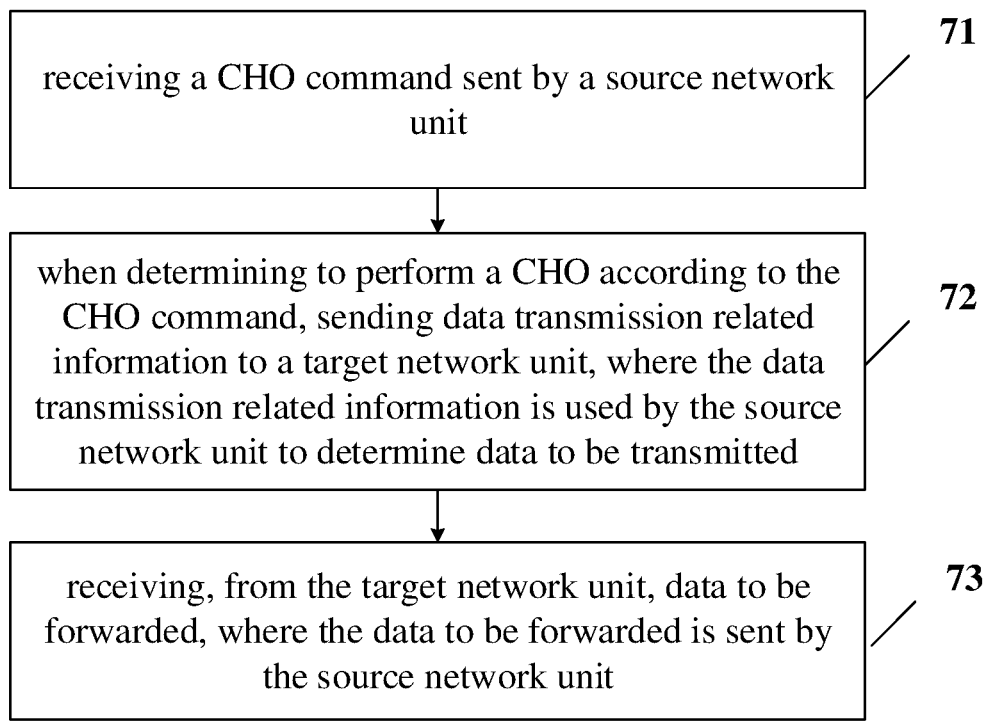

As shown in FIG. 7, a condition handover method applied to a terminal includes:

Step 71: receiving a CHO command sent by a source network unit;

Step 72: when determining to perform a CHO according to the CHO command, sending data transmission related information to a target network unit, where the data transmission related information is used by the source network unit to determine data to be transmitted;

Step 73: receiving, from the target network unit, data to be forwarded, where the data to be forwarded is sent by the source network unit, that is, receive the data to be forwarded from the target network unit, and then the data to be forwarded is sent by the source network unit.

Figure 8:
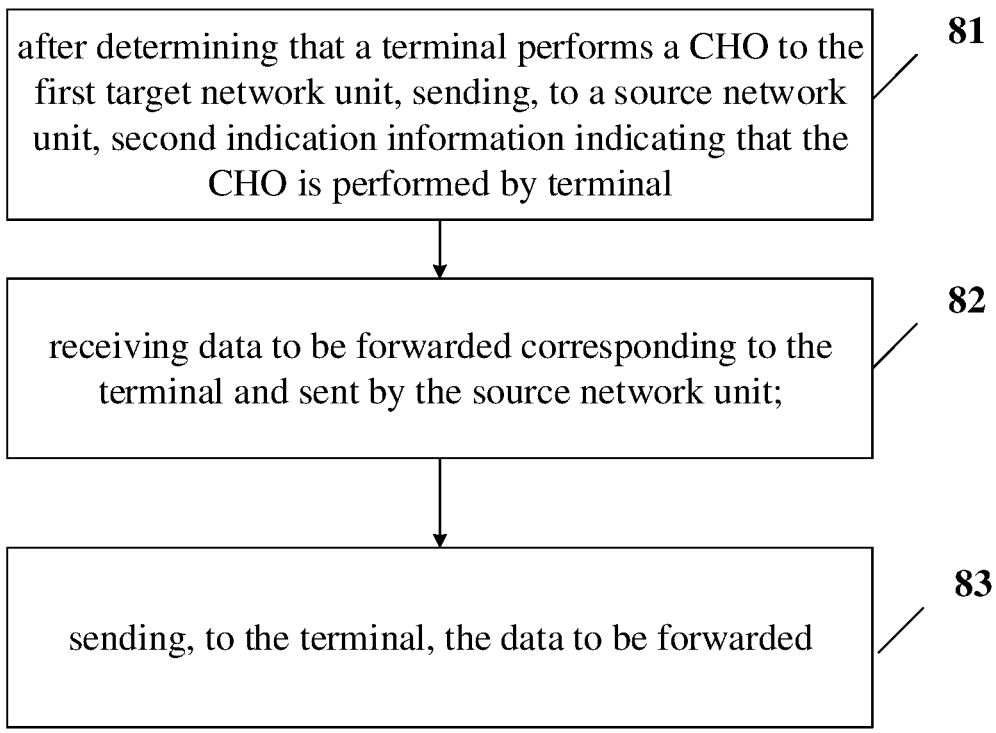
FIG. 8 is a schematic flowchart of a condition handover method applied to a target network unit in an embodiment of the present disclosure.

For the target network unit, corresponding to the above-mentioned Method 2, a condition handover method applied to the first target network unit is provided in an embodiment of the present disclosure, as shown in FIG. 8, the method includes:

Step 81: after determining that a terminal performs a CHO to the first target network unit, sending, to a source network unit, second indication information indicating that the CHO is performed by terminal;

Step 82: receiving data to be forwarded corresponding to the terminal and sent by the source network unit;

Step 83: sending, to the terminal, the data to be forwarded.

Before sending the second indication information indicating that the CHO to the source network unit is performed by the terminal, the method further includes:

receiving a sequence number of a data packet received by the terminal which is sent by the terminal;

the sending to the source network unit the second indication information indicating that the CHO is performed by terminal further includes:

sending, to the source network unit, the second indication information indicating that the CHO is performed by terminal and carrying the sequence number.

The terminal may transmit the sequence number through various messages, such as CHO request message, a CHO completion message, an MSG3 message, and other self-defined messages.

One of the implementation schemes of the embodiments of the present disclosure is described in further detail as follows.

Figure 9:
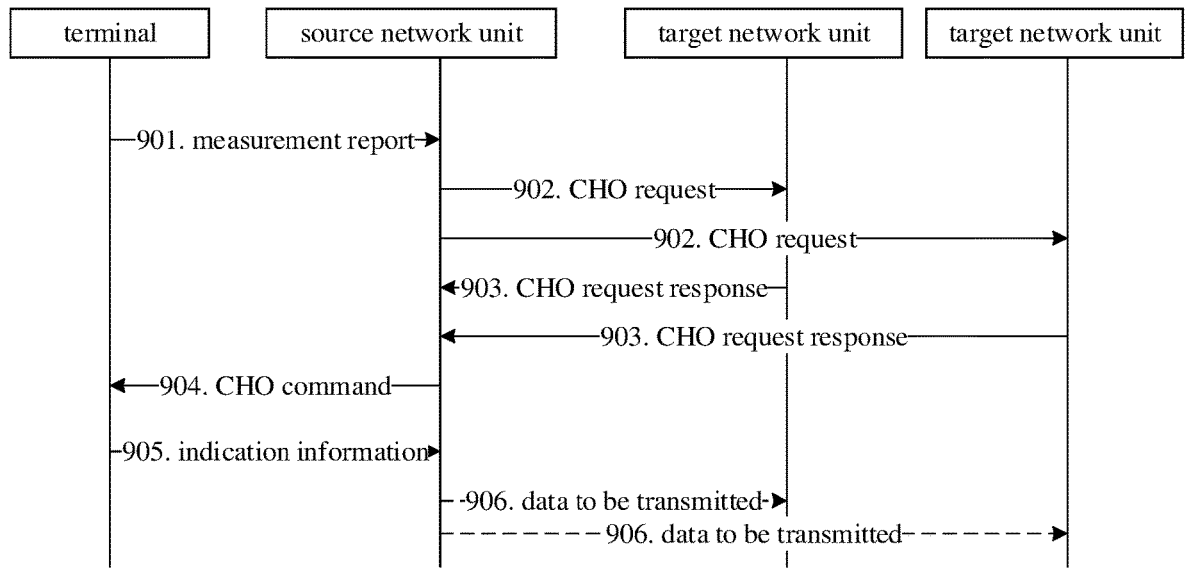
FIG. 9 is a schematic view of a network flow of a condition handover method in an embodiment of the present disclosure.

As shown in FIG. 9, the condition handover method of the embodiment of the present disclosure includes:

Step 901: the source network unit receives a measurement report of the terminal;

Step 902: the source network unit selects one or more (two target objects as an example in the drawings) target objects (which may be a base station or a cell, and the base station is used as an example in the drawings) based on the measurement report, and then sends a condition handover request to the selected target base station;

Step 903: the source network unit receives a condition handover request response returned by the selected target base station;

Step 904: the source network unit sends one or more CHO commands to the terminal through a RRC reconfiguration command, where each CHO command may carry one or more CHO conditions;

Step 905: during the operation of the terminal, when one of the CHO conditions is met, the terminal will indicates to the source network unit that the terminal will perform the CHO, which carries the target base station corresponding to the CHO to be performed, and the terminal will stop sending uplink data to the source network unit and start the CHO process;

Step 906: after receiving the indication, the source network unit stops sending downlink data to the terminal, and sends the received downlink data and data transmission related information (including the terminal's downlink data sequence number and uplink data sequence number, etc.) to the target base station (the dotted lines in the drawing indicate that both of them are possible).

From the description of the above process, it can be found that in the embodiment of the present disclosure, since the terminal will notify the source network unit in time when the handover occurs, the source network unit may forward the undelivered downlink data to the target base station in time, so as to ensure the data integrity.

The following is a detailed description of another implementation scheme of the embodiments of the present disclosure as follows.

Figure 10:
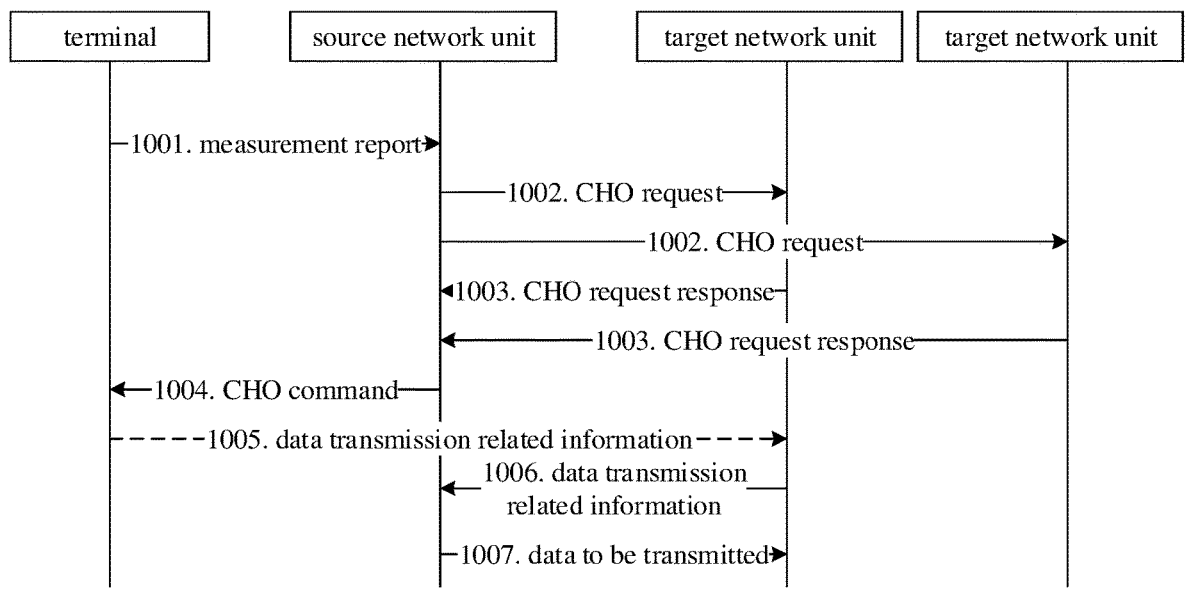
FIG. 10 is a schematic view of a network flow of another condition handover method in an embodiment of the present disclosure.

As shown in FIG. 10, a condition handover method in the embodiment of the present disclosure includes:

Step 1001: the source network unit receives a measurement report of the terminal;

Step 1002: the source network unit selects one or more (two as an example in the drawings) target objects (which may be a base station or a cell, and the base station is taken as an example in the figure) based on the measurement report, and then sends a condition handover request to the selected one or more target base stations respectively.

Step 1003: the source network unit receives a condition handover request response returned by the selected target base stations;

Step 1004: the source network unit sends one or more CHO commands to the terminal through the RRC reconfiguration command. Each CHO command may carry one or more CHO conditions. At the same time, the source network unit buffers the data packet not acknowledged by the terminal;

During the operation of the terminal, when one of the CHO conditions is met, terminal t will directly stop sending uplink data to the source network unit and start the CHO process;

Step 1005: the terminal sends the data transmission related information (including the terminal's downlink data sequence number and uplink data sequence number, etc.) to the target base station during the CHO process or after the CHO is completed;

In this step, the above-mentioned data transmission related information may be reported through a CHO completion message, an MSG3 or other customized types of message;

Step 1006: the target base station sends the received data transmission related information to the source network unit during the CHO process or after the CHO is completed;

Step 1007: after receiving the data transmission related information, the source network unit selects, from the buffered downlink data packets, data packets not received by the terminal, and sends the data packets to the first target network unit according to the data transmission related information.

From the description of the above process, it can be found that in the embodiment of the present disclosure, although the terminal does not notify the source network unit of the occurrence of CHO, because the source network unit buffers all data packets not acknowledged by the terminal, after receiving the notification notifying that the terminal has performed the CHO to the target base station, all the data packets not received by the terminal may be sent to the target base station and then sent to the terminal by the target base station, thereby ensuring the data integrity, when the terminal has CHO to the target base station notification, it can send all the data packets that the terminal has not received to the target base station, and the target base station sends to the terminal, ensuring the integrity of the data.

Figure 11:
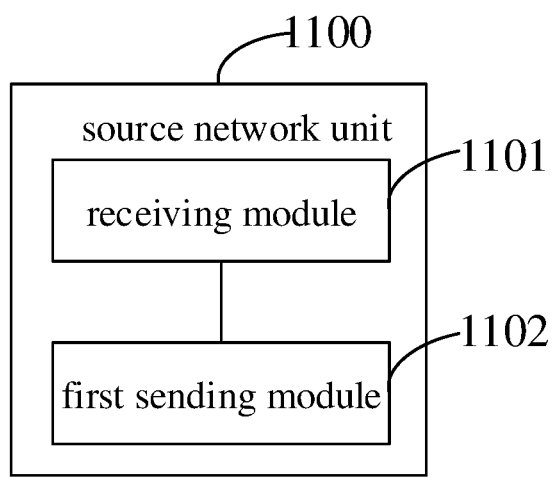
FIG. 11 is a structural view of a source network unit in an embodiment of the present disclosure.

Referring to FIG. 11, based on the same concept, a source network unit 1100 is further provided in an embodiment of the present disclosure, including:

a receiving module 1101, configured to receive indication information indicating that a CHO is performed by a terminal; and a first sending module 1102, configured to send, to a first target network unit corresponding to the CHO performed by the terminal, data to be forwarded corresponding to the terminal.

The source network unit 1100 further includes:

a processing module, configured to stop sending downlink data to the terminal.

In the embodiment of the present disclosure, the indication information is:

first indication information sent when the terminal determines to perform the CHO according to a CHO condition; or second indication information sent by the first target network unit when determining that the terminal performs the CHO to the first target network unit.

In the embodiment of the present disclosure, the first indication information carries identification information of the first target network unit.

In the embodiment of the present disclosure, the source network unit 1100 further includes:

a second sending module, configured to send third indication information to a second target network unit to instruct the second target network unit to release resources reserved for the CHO; where the second target network unit is a unit that reserves the resources for the CHO of the terminal other than the first target network unit.

In the embodiment of the present disclosure, the indication information is the second indication information, and the source network unit 1100 further includes:

a buffering module, configured to: after a CHO command is sent to the terminal, buffer downlink data packets not acknowledged by the terminal;

where the second indication information carries a sequence number of a data packet received by the terminal;

the first sending module 1102 is configured to:

select, from the buffered downlink data packets and based on the sequence number, a data packet not received by the terminal, and send the data packet not received by the terminal to the first target network unit.

The source network unit 1100 provided in the embodiment of the present disclosure may implement each process implemented by the source network unit in the method embodiment in FIG. 2, and to avoid repetition, details are not described herein again.

Figure 12:
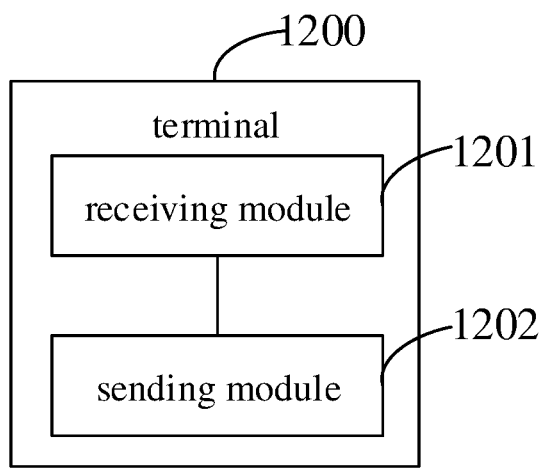
FIG. 12 is a structural view of a terminal in an embodiment of the present disclosure.

Referring to FIG. 12, based on the same concept, a terminal 1200 is provided in an embodiment of the present disclosure, including:

a receiving module 1201, configured to receive a CHO command sent by a source network unit;

a sending module 1202, configured to, when determining to perform a CHO according to the CHO command, send, to the source network unit, first indication information indicating that the CHO is performed by the terminal.

In the foregoing embodiment, the first indication information carries the unit identifier of the first target network unit corresponding to the CHO operation.

The terminal 1200 provided in the embodiment of the present disclosure can implement each process implemented by the source network unit in the method embodiment of FIG. 3, and to avoid repetition, details are not described herein again.

Figure 13:
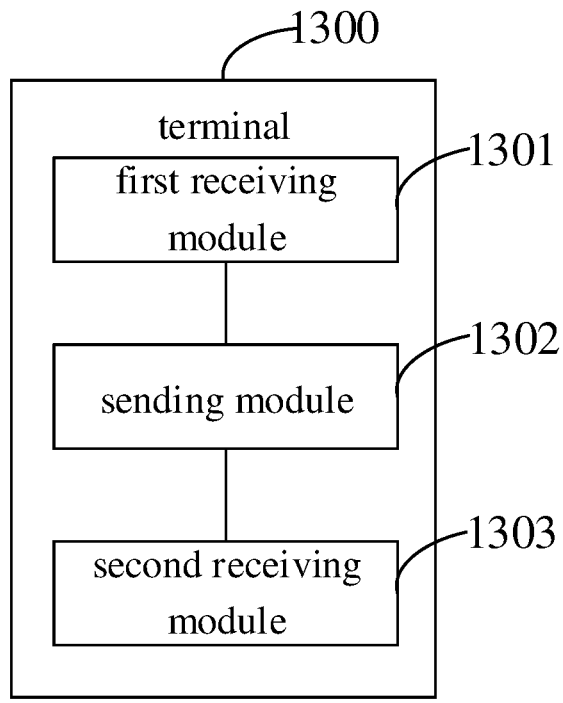
FIG. 13 is a structural view of another terminal in an embodiment of the present disclosure.

Referring to FIG. 13, based on the same concept, a terminal 1300 is further provided in an embodiment of the present disclosure, including:

a first receiving module 1301, configured to receive a CHO command sent by a source network unit;

a sending module 1302, configured to, when determining to perform a CHO according to the CHO command, send data transmission related information to a target network unit, where the data transmission related information is used by the source network unit to determine data to be transmitted; and a second receiving module 1303, configured to receive, from the target network unit, data to be forwarded, where the data to be forwarded is sent by the source network unit.

The terminal in the embodiment of the present disclosure may implement each process implemented by the source network unit in the method embodiment of FIG. 4, and to avoid repetition, details are not described herein again.

Figure 14:
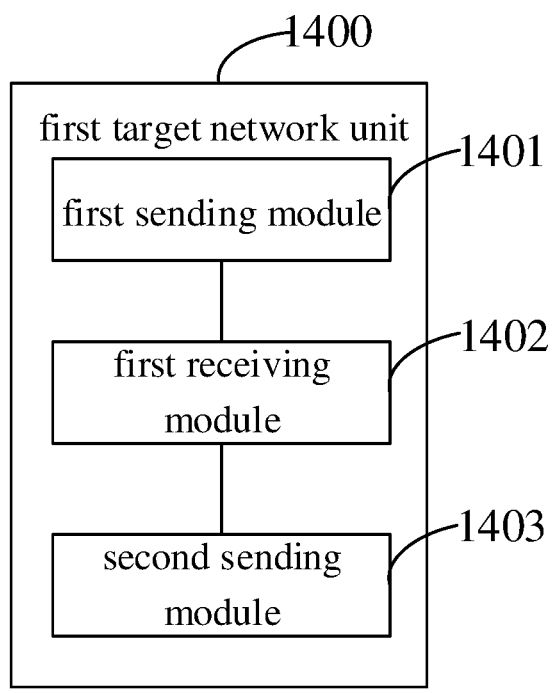
FIG. 14 is a structural view of a target network unit in an embodiment of the present disclosure.

Referring to FIG. 14, based on the same concept, a first target network unit 1400 is further provided in an embodiment of the present disclosure, including:

a first sending module 1401, configured to, after determining that a terminal performs a CHO to the first target network unit, send, to a source network unit, second indication information indicating that the CHO is performed by terminal;

a first receiving module 1402, configured to receive data to be forwarded corresponding to the terminal and sent by the source network unit; and a second sending module 1403, configured to send, to the terminal, the data to be forwarded.

In the embodiment of the present disclosure, the first target network unit 1400 further includes:

a second receiving module, configured to receive a sequence number of a data packet received by the terminal which is sent by the terminal;

the first sending module 1401 is configured to:

send, to the source network unit, the second indication information indicating that the CHO is performed by terminal and carrying the sequence number.

In the embodiment of the present disclosure, the sequence number is received through a CHO completion message and an MSG3 message.

The first target network unit 1400 provided in the embodiment of the present disclosure may implement each process implemented by the first target network unit in the method embodiment of FIG. 5, and in order to avoid repetition, details are not described herein again.

Figure 15:
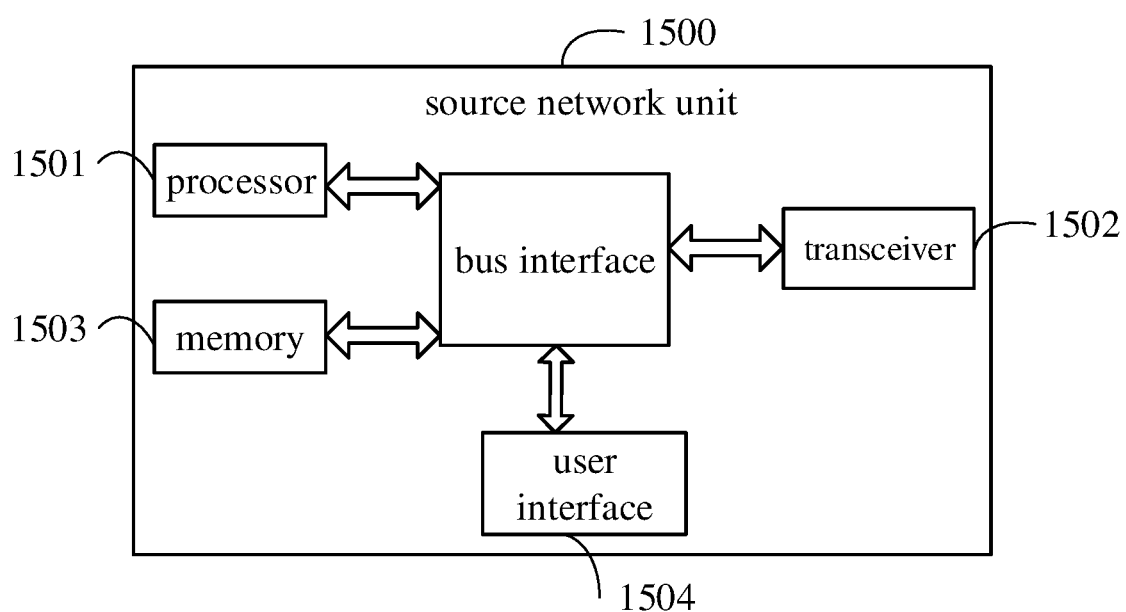
FIG. 15 is a structural view of another source network unit in an embodiment of the present disclosure.

Referring to FIG. 15 which is a structural view of a source network unit in an embodiment of the present disclosure, which may implement the details of the condition handover method in the foregoing embodiment and achieve the same effect. As shown in FIG. 15, the source network unit 1500 includes: a processor 1501, a transceiver 1502, a memory 1503, a user interface 1504, and a bus interface, The processor 1501 is configured to read a program in the memory 1503 to:

receive indication information indicating that a CHO is performed by a terminal; and send, to a first target network unit corresponding to the CHO performed by the terminal, data to be forwarded corresponding to the terminal In FIG. 15, the bus architecture may include any number of interconnected buses and bridges. Specifically, one or more processors represented by the processor 1501 and various circuits of the memory represented by the memory 1503 are linked together. The bus architecture can also link various other circuits such as peripherals, voltage regulators, power management circuits, etc., which are all known in the art, and therefore, no further description will be given herein. The bus interface provides the interface. The transceiver 1502 may be a plurality of elements, that is, including a transmitter and a receiver, and provide a unit for communicating with various other devices on the transmission medium. For different user equipment, the user interface 1504 may also be an interface capable of connecting externally and internally with required equipment. The connected equipment includes but not limited to a keypad, a display, a speaker, a microphone, a joystick, etc.

The processor 1501 is responsible for managing the bus architecture and general processing, and the memory 1503 can store data used by the processor 1501 when performing operations.

In the embodiment of the present disclosure, the processor 1501 is further configured to:

stop sending downlink data to the terminal.

In the embodiment of the present disclosure, the indication information is:

first indication information sent when the terminal determines to perform the CHO according to a CHO condition; or second indication information sent by the first target network unit when determining that the terminal performs the CHO to the first target network unit In the embodiment of the present disclosure, the first indication information carries identification information of the first target network unit.

In the embodiment of the present disclosure, the processor 1501 is further configured to:

after receiving the indication information, send third indication information to a second target network unit to instruct the second target network unit to release resources reserved for the CHO, where the second target network unit is a unit that reserves the resources for the CHO of the terminal other than the first target network unit In the embodiment of the present disclosure, the processor 1501 is further configured to: after a CHO command is sent to the terminal, buffer downlink data packets not acknowledged by the terminal;

the second indication information carries a sequence number of a data packet received by the terminal.

The processor 1501 is further configured to select, from the buffered downlink data packets and based on the sequence number, a data packet not received by the terminal, and send the data packet not received by the terminal to the first target network unit.

Optionally, a source network unit is further provided in the embodiment of the present disclosure, including a processor 1501, a memory 1503, a computer program stored in the memory 1503 and running on the processor 1501, and the computer program is executed by the processor 1501. During execution, the steps performed by the source network unit in the embodiment of the condition handover method described above are implemented, and the same technical effect can be achieved. To avoid repetition, details are not described herein again.

Figure 16:
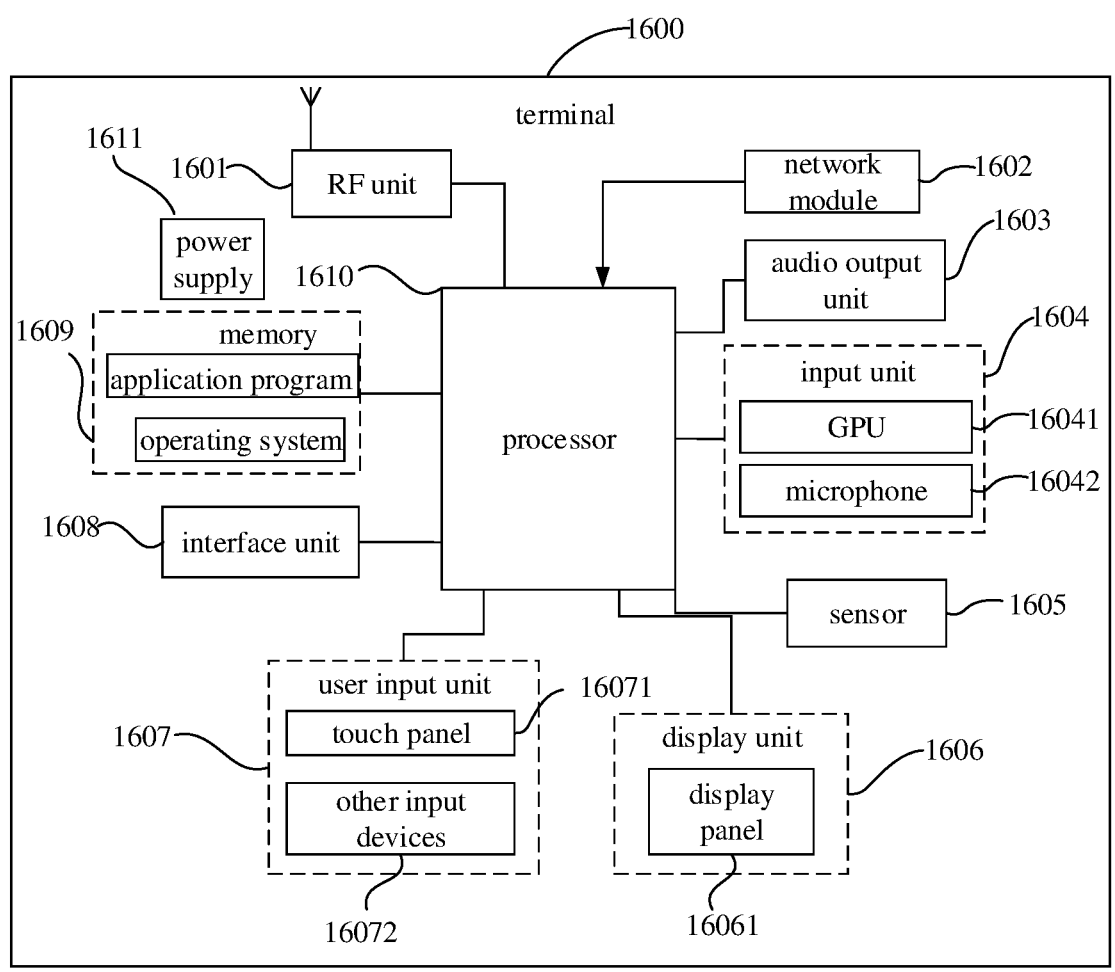
FIG. 16 is a structural view of another terminal in an embodiment of the present disclosure.

Referring to FIG. 16. FIG. 16 is a schematic view of the hardware structure of a terminal implementing various embodiments of the present disclosure. The terminal 1600 includes but is not limited to: a radio frequency unit 1601, a network module 1602, an audio output unit 1603, an input unit 1604, and a sensor 1605. Display unit 1606, user input unit 1607, interface unit 1608, memory 1609, processor 1610, power supply 1611 and other components. Those skilled in the art can understand that the terminal structure shown in FIG. 16 does not constitute a limitation on the terminal, and the terminal may include more or fewer components than shown in the figure, or combine some components, or arrange different components. In the embodiments of the present disclosure, terminals include, but are not limited to, mobile phones, tablet computers, notebook computers, palmtop computers, vehicle-mounted terminals, wearable devices, and pedometers.

The processor 1610 is configured to:

receive a CHO command sent by a source network unit:

when determining to perform a CHO according to the CHO command, send, to the source network unit, first indication information indicating that the CHO is performed by the terminal.

In the embodiment of the present disclosure, the first indication information carries a unit identifier of the first target network unit corresponding to the CHO operation.

In another manner, the processor 1610 is used to:

receive a CHO command sent by a source network unit;

when determining to perform a CHO according to the CHO command, send data transmission related information to a target network unit, where the data transmission related information is used by the source network unit to determine data to be transmitted;

receive, from the target network unit, data to be forwarded, where the data to be forwarded is sent by the source network unit.

It should be understood that, in the embodiment of the present disclosure, the radio frequency unit 1601 can be used for receiving and sending signals in the process of sending and receiving information or talking. Specifically, the downlink data from the base station is received and sent to the processor 1610 for processing; Uplink data is sent to the base station. Generally, the radio frequency unit 1601 includes, but is not limited to, an antenna, at least one amplifier, a transceiver, a coupler, a low noise amplifier, a duplexer, and the like. In addition, the radio frequency unit 1601 can also communicate with the network and other devices through a wireless communication system.

The terminal provides users with wireless broadband Internet access through the network module 1602, such as helping users to send and receive emails, browse web pages, and access streaming media.

The audio output unit 1603 may convert the audio data received by the radio frequency unit 1601 or the network module 1602 or stored in the memory 1609 into audio signals and output them as sounds.

Moreover, the audio output unit 1603 may also provide audio output related to a specific function performed by the terminal 1600 (for example, call signal reception sound, message reception sound, etc.). The audio output unit 1603 includes a speaker, a buzzer, and a receiver. The input unit 1604 is used to receive audio or video signals. The input unit 1604 may include a graphics processing unit (Graphics Processing Unit, GPU) 16041 and a microphone 16042. The graphics processor 16041 is configured to respond to still pictures or video images obtained by an image capture device (such as a camera) in a video capture mode or an image capture mode. The processed image frame can be displayed on the display unit 1606. The image frame processed by the graphics processor 16041 may be stored in the memory 1609 (or other storage medium) or sent via the radio frequency unit 1601 or the network module 1602. The microphone 16042 can receive sound and can process such sound into audio data. The processed audio data can be converted into a format that can be sent to the mobile communication base station via the radio frequency unit 1601 for output in the case of a telephone call mode.

The terminal 1600 also includes at least one sensor 1605, such as a light sensor, a motion sensor, and other sensors. Specifically, the light sensor includes an ambient light sensor and a proximity sensor. The ambient light sensor can adjust the brightness of the display panel 16061 according to the brightness of the ambient light. The proximity sensor can close the display panel 16061 and/or backlight when the terminal 1600 is moved to the ear. As a kind of motion sensor, the accelerometer sensor can detect the magnitude of acceleration in various directions (usually three-axis), and can detect the magnitude and direction of gravity when stationary, and can be used to identify terminal posture (such as horizontal and vertical screen handover, related games, Magnetometer attitude calibration), vibration recognition related functions (such as pedometer, percussion), etc.; sensors 1605 can also include fingerprint sensors, pressure sensors, iris sensors, molecular sensors, gyroscopes, barometers, hygrometers, thermometers, infrared Sensors, etc., will not be repeated here.

The display unit 1606 is used to display information input by the user or information provided to the user. The display unit 1606 may include a display panel 16061, and the display panel 16061 may be configured in the form of a liquid crystal display (Liquid Crystal Display LCD), an organic light-emitting diode (Organic Light-emitting Diode, OLED), etc.

The user input unit 1607 may be used to receive inputted number or character information, and generate key signal input related to user settings and function control of the terminal. Specifically, the user input unit 1607 includes a touch panel 16071 and other input devices 16072. The touch panel 16071, also known as a touch screen, can collect user touch operations on or near it (for example, the user uses any suitable objects or accessories such as fingers, stylus, etc.) on the touch panel 16071 or near the touch panel 16071). The touch panel 16071 may include two parts: a touch detection device and a touch controller. The touch detection device detects the user's touch position, and detects the signal brought by the touch operation, and transmits the signal to the touch controller; the touch controller receives the touch information from the touch detection device, converts it into contact coordinates, and then sends it To the processor 1610, the command sent by the processor 1610 is received and executed. In addition, the touch panel 16071 can be realized in multiple types such as resistive, capacitive, infrared, and surface acoustic wave. In addition to the touch panel 16071, the user input unit 1607 may also include other input devices 16072. Specifically, other input devices 16072 may include, but are not limited to, a physical keyboard, function keys (such as volume control buttons, switch buttons, etc.), trackball, mouse, and joystick, which will not be repeated here.

Further, the touch panel 16071 can cover the display panel 16061. When the touch panel 16071 detects a touch operation on or near it, it transmits it to the processor 1610 to determine the type of the touch event, and then the processor 1610 determines the type of the touch event. The type of event provides corresponding visual output on the display panel 16061. Although in FIG. 16, the touch panel 16071 and the display panel 16061 are used as two independent components to realize the input and output functions of the terminal, but in some embodiments, the touch panel 16071 and the display panel 16061 may be integrated to realize the input and output functions of the terminal, which are not limited here.

The interface unit 1608 is an interface for connecting an external device and the terminal 1600. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 1608 may be used to receive input (for example, data information, power, etc.) from an external device and transmit the received input to one or more elements in the terminal 1600 or may be used to communicate between the terminal 1600 and the external device. Transfer data between.

The memory 1609 can be used to store software programs and various data. The memory 1609 may mainly include a storage program area and a storage data area. The storage program area may store an operating system, an application program required by at least one function (such as a sound playback function, an image playback function, etc.), etc.; the storage data area may store data (such as audio data, phone book, etc.) created by the use of mobile phones. In addition, the memory 1609 may include a high-speed random access memory, and may also include a non-volatile memory, such as at least one magnetic disk storage device, a flash memory device, or other volatile solid-state storage devices.

The processor 1610 is the control center of the terminal. It uses various interfaces and lines to connect the various parts of the entire terminal. It executes by running or executing software programs and/or modules stored in the memory 1609, and calling data stored in the memory 1609. Various functions of the terminal and processing data, so as to monitor the terminal as a whole. The processor 1610 may include one or more processing units; optionally, the processor 1610 may integrate an application processor and a modem processor. The application processor mainly processes the operating system, user interface, and application programs, etc. The adjustment processor mainly deals with wireless communication. It can be understood that the foregoing modem processor may not be integrated into the processor 1610.

The terminal 1600 may also include a power source 1611 (such as a battery) for supplying power to various components. Optionally, the power source 1611 may be logically connected to the processor 1610 through a power management system, so as to manage charging, discharging, and power consumption management through the power management system. And other functions.

In addition, the terminal 1600 includes some functional modules not shown, which will not be repeated here.

Optionally, an embodiment of the present disclosure further provides a terminal, including a processor 1610, a memory 1609, a computer program stored in the memory 1609 and executable on the processor 1610, when the computer program is executed by the processor 1610 The steps performed by the terminal in the foregoing condition handover method embodiment are implemented, and the same technical effect can be achieved. To avoid repetition, details are not repeated here.

When determining to perform a CHO according to the CHO command, data transmission related information is sent to a target network unit, where the data transmission related information is used by the source network unit to determine data to be transmitted.

Figure 17:
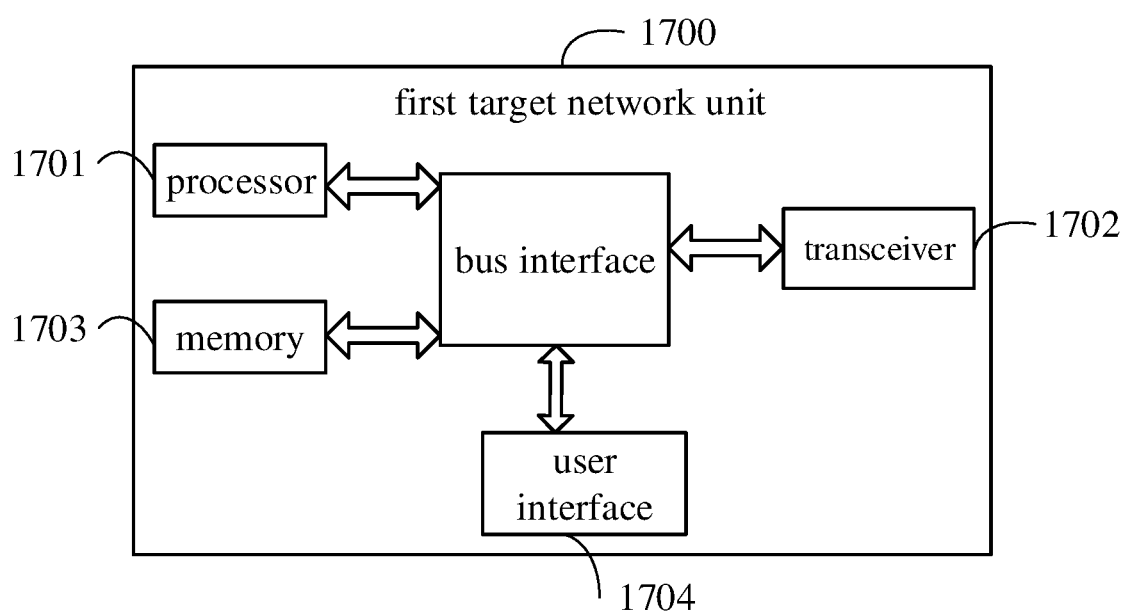
FIG. 17 is a structural view of another target network unit in an embodiment of the present disclosure.

Referring to FIG. 17 which is a structural view of the first target network unit in an embodiment of the present disclosure, which can implement the details of the condition handover method in the foregoing embodiment and achieve the same effect.

As shown in FIG. 17, the first target network unit 1700 includes: a processor 1701, a transceiver 1702, a memory 1703, a user interface 1704, and a bus interface.

The processor 1701 is configured to read a program in the memory 1703 to:

after determining that a terminal performs a CHO to the first target network unit, send, to the first target network unit 1700, second indication information indicating that the CHO is performed by terminal;

receive data to be forwarded corresponding to the terminal and sent by the source network unit, and send, to the terminal, the data to be forwarded.

In the embodiment of the present disclosure, the processor 1701 is further configured to:

receive a sequence number of a data packet received by the terminal which is sent by the terminal;

send, to the first target network unit 1700, the second indication information indicating that the CHO is performed by terminal and carrying the sequence number.

In the embodiment of the present disclosure, the sequence number is received through a CHO completion message and an MSG3 message.

In FIG. 17, the bus architecture may include any number of interconnected buses and bridges. Specifically, one or more processors represented by the processor 1701 and various circuits of the memory represented by the memory 1703 are linked together. The bus architecture can also link various other circuits such as peripherals, voltage regulators, power management circuits, etc., which are all known in the art, and therefore, no further description will be given herein. The bus interface provides the interface. The transceiver 1702 may be a plurality of elements, that is, include a transmitter and a receiver, and provide a unit for communicating with various other devices on the transmission medium. For different user equipment, the user interface 1704 may also be an interface capable of externally connecting internally required equipment, and the connected equipment includes but not limited to a keypad, a display, a speaker, a microphone, a joystick, etc.

The processor 1701 is responsible for managing the bus architecture and general processing, and the memory 1703 can store data used by the processor 1701 when performing operations.

Optionally, a first target network unit is further provided in the embodiment of the present disclosure, including a processor 1701, a memory 1703, a computer program stored in the memory 1703 and executable on the processor 1701, and the processor 1701 executes the computer program to perform the CHO method hereinabove, and the same technical effect may be achieved. To avoid repetition, details are not repeated here.

The terminal in the embodiments of the present disclosure may be a wireless terminal or a wired terminal. A wireless terminal may be a device that provides voice and/or other service data connectivity to users, a handheld device with wireless connection function, or a wireless modem connected to it. Other processing equipment. A wireless terminal can communicate with one or more core networks via a radio access network (Radio Access Network, RAN). The wireless terminal can be a mobile terminal, such as a mobile phone (or called a "cellular" phone) and a mobile phone with a mobile terminal. Computers, for example, can be portable, pocket-sized, handheld, computer-built or vehicle-mounted mobile devices, which exchange language and/or data with the wireless access network. For example, personal communication service (personal communication service, PCS) phones, cordless phones, session initiation protocol (Session Initiation Protocol, SIP) phones, wireless local loop (Wireless Local Loop, WLL) stations, personal digital assistants (Personal Digital Assistants, PDA) and other equipment. Wireless terminal can also be called system, subscriber unit (Subscriber Unit), Subscriber Station, Mobile Station, mobile station (Mobile), Remote Station, Remote Terminal, Access Terminal), user terminal (User Terminal, user agent (User Agent), and terminal (User Device or User Equipment), which are not limited here.

The embodiments of the present disclosure also provide a computer-readable storage medium, and a computer program is stored in the computer-readable storage medium. When the computer program is executed by a processor, each process of any of the above-mentioned condition handover method embodiments is realized and can achieve the same technical effect, in order to avoid repetition, will not be repeated here. The computer-readable storage medium, such as read-only memory (Read-Only Memory, ROM), random access memory (Random Access Memory, RAM), magnetic disk or optical disk, etc.

It should be noted that in this article, the terms "include", "including" or any other variants thereof are intended to cover non-exclusive inclusion, so that a process, method, article or device including a series of elements not only includes those elements, It also includes other elements that are not explicitly listed, or elements inherent to the process, method, article, or device. If there are no more restrictions, the element defined by the sentence "including a . . . " does not exclude the existence of other same elements in the process, method, article or device that includes the element.

Through the description of the above embodiments, those skilled in the art can clearly understand that the method of the above embodiments can be implemented by means of software plus the necessary general hardware platform. Of course, it can also be implemented by hardware, but in many cases the former is better. Based on this understanding, the technical solution of the present disclosure essentially or the part that contributes to the prior art can be embodied in the form of a software product, and the computer software product is stored in a storage medium (such as ROM/RAM, magnetic disk, The optical disc) includes several instructions to make a terminal (which can be a mobile phone, a computer, a server, an air conditioner, or a network device, etc.) execute the methods described in the various embodiments of the present disclosure.

The embodiments of the present disclosure are described above with reference to the drawings, but the present disclosure is not limited to the above-mentioned embodiments. The above-mentioned embodiments are only illustrative and not restrictive. Those of ordinary skill in the art may make many forms without departing from the purpose of the present disclosure and the scope of the claims, all of which fall within the scope of the present disclosure.

What is claimed is:

1. A Condition Handover (CHO) method, applied to a source network unit, comprising:
receiving indication information indicating that a CHO is performed by a terminal; and
sending, to a first target network unit corresponding to the CHO performed by the terminal, data to be forwarded corresponding to the terminal;
wherein the indication information is:
first indication information sent when the terminal determines to perform the CHO according to a CHO condition; or
second indication information sent by the first target network unit when determining that the terminal performs the CHO to the first target network unit; wherein
subsequent to the receiving the indication information, the method further comprises:
sending third indication information to a second target network unit to instruct the second target network unit to release resources reserved for the CHO;
wherein the second target network unit is a unit that reserves the resources for the CHO of the terminal other than the first target network unit;
or
the indication information is the second indication information, and the CHO method further comprises:
after a CHO command is sent to the terminal, buffering downlink data packets not acknowledged by the terminal;
wherein the second indication information carries a sequence number of a data packet received by the terminal;
the sending to the first target network unit corresponding to the CHO performed by the terminal the data to be forwarded corresponding to the terminal further comprises:
selecting, from the buffered downlink data packets and based on the sequence number, a data packet not received by the terminal, and sending the data packet not received by the terminal to the first target network unit.

2. The CHO method according to claim 1, wherein subsequent to the receiving the indication information, the method further comprises: stopping sending downlink data to the terminal.

3. The CHO method according to claim 1, wherein the first indication information carries identification information of the first target network unit.

4. A Condition Handover (CHO) method, applied to a terminal, comprising:
receiving a CHO command sent by a source network unit;
when determining to perform a CHO according to the CHO command, sending a sequence number of a data packet received by the terminal to a first target network unit, wherein the sequence number of the data packet received by the terminal is used by the source network unit to determine data to be transmitted; and
receiving, from the first target network unit, a data packet not received by the terminal, wherein the data packet not received by the terminal is sent by the source network unit to the first target network unit.

5. A Condition Handover (CHO) method, applied to a first target network unit, comprising:
after determining that a terminal performs a CHO to the first target network unit, sending, to a source network unit, second indication information indicating that the CHO is performed by terminal;
receiving a data packet not received by the terminal which is sent by the source network unit; and
sending, to the terminal, the data packet not received by the terminal;
wherein prior to the sending to the source network unit the second indication information indicating that the CHO is performed by terminal, the method further comprises:
receiving a sequence number of a data packet received by the terminal which is sent by the terminal;
the sending to the source network unit the second indication information indicating that the CHO is performed by the terminal further comprises:
sending, to the source network unit, the second indication information indicating that the CHO is performed by terminal and carrying the sequence number.

6. The source network unit, comprising: a processor, a memory and a computer program stored in the memory and executable on the processor, wherein the processor executes the computer program to perform the CHO method according to claim 1.

7. The source network unit according to claim 6, wherein the processor executes the computer program to stop sending downlink data to the terminal.

8. The source network unit according to claim 6, wherein the first indication information carries identification information of the first target network unit.

9. The terminal, comprising: a processor, a memory and a computer program stored in the memory and executable on the processor, wherein the processor executes the computer program to perform the CHO method according to claim 4.

10. The first target network unit, comprising: a processor, a memory and a computer program stored in the memory and executable on the processor, wherein the processor executes the computer program to perform the CHO method according to claim 5.

* * * * *